US011548332B2

(12) United States Patent
Fischer et al.

(10) Patent No.: US 11,548,332 B2
(45) Date of Patent: Jan. 10, 2023

(54) CONTROL DEVICE AND ELECTRONIC WHEEL UNIT FOR A WHEEL-MONITORING SYSTEM OF A VEHICLE, WHEEL-MONITORING SYSTEM FOR A VEHICLE AND METHOD FOR MONITORING WHEELS IN A VEHICLE

(71) Applicant: CONTINENTAL AUTOMOTIVE GMBH, Hannover (DE)

(72) Inventors: Frank Fischer, Regensburg (DE); Michael Loeffler, Zeitlarn (DE)

(73) Assignee: Continental Automotive GmbH, Hannover (DE)

( * ) Notice: Subject to any disclaimer, the term of this patent is extended or adjusted under 35 U.S.C. 154(b) by 735 days.

(21) Appl. No.: 16/471,256

(22) PCT Filed: Dec. 14, 2017

(86) PCT No.: PCT/EP2017/082793
§ 371 (c)(1),
(2) Date: Jun. 19, 2019

(87) PCT Pub. No.: WO2018/114582
PCT Pub. Date: Jun. 28, 2018

(65) Prior Publication Data
US 2020/0086697 A1    Mar. 19, 2020

(30) Foreign Application Priority Data
Dec. 19, 2016    (DE) .................... 10 2016 225 429.4

(51) Int. Cl.
*B60C 23/04*    (2006.01)
*G07C 5/00*    (2006.01)
*G07C 5/08*    (2006.01)

(52) U.S. Cl.
CPC ...... *B60C 23/0486* (2013.01); *B60C 23/0471* (2013.01); *B60C 23/0479* (2013.01); *G07C 5/008* (2013.01); *G07C 5/08* (2013.01)

(58) Field of Classification Search
USPC ........................................................ 701/31.4
See application file for complete search history.

(56) References Cited

U.S. PATENT DOCUMENTS 6,313,742 B1 * 11/2001 Larson ................. B60C 23/061
340/444
6,463,799 B1    10/2002 Oldenettel et al.
(Continued)

FOREIGN PATENT DOCUMENTS

CN    101873943 A    10/2010
CN    104118284 A    10/2014
(Continued)

*Primary Examiner* — Tyler D Paige
(74) *Attorney, Agent, or Firm* — Laurence A. Greenberg; Werner H. Stemer; Ralph E. Locher

(57) ABSTRACT

A control device is provided for a wheel-monitoring system of a vehicle which is equipped with vehicle wheels. At least one of the vehicle wheels is equipped with an electronic wheel unit, arranged thereon, for detecting at least one wheel operating parameter of the respective vehicle wheel for transmitting wheel operating data to the control device. The control device makes available an abnormality message in the event of an abnormality which is determined on the basis of the transmitted wheel operating data. The control device also takes into account position data relating to a current position of the vehicle for the determination of the abnormality.

19 Claims, 3 Drawing Sheets

(56) References Cited

U.S. PATENT DOCUMENTS

| | | | |
|---|---|---|---|
| 6,499,343 B1 | 12/2002 | Haas et al. | |
| 8,463,488 B1* | 6/2013 | Hart | G06F 17/00 |
| | | | 701/32.4 |
| 9,387,734 B1 | 7/2016 | Alhazmi | |
| 9,505,502 B2 | 11/2016 | Miller | |
| 9,996,988 B2 | 6/2018 | Liu et al. | |
| 10,035,387 B2 | 7/2018 | Carresjoe et al. | |
| 10,245,905 B2* | 4/2019 | Sudou | B60C 23/0486 |
| 11,231,292 B1* | 1/2022 | Hobbs | G01C 21/34 |
| 2002/0095980 A1 | 7/2002 | Breed et al. | |
| 2007/0050121 A1 | 3/2007 | Ammon et al. | |
| 2009/0066498 A1 | 3/2009 | Jongsma et al. | |
| 2012/0221196 A1 | 8/2012 | Seymour et al. | |
| 2013/0030658 A1 | 1/2013 | Linster | |
| 2015/0158347 A1* | 6/2015 | Fritz | B60C 23/0408 |
| | | | 340/442 |
| 2015/0206181 A1* | 7/2015 | Parundekar | G06Q 30/0261 |
| | | | 705/14.49 |
| 2016/0272017 A1 | 9/2016 | Ghannam et al. | |
| 2016/0347130 A1* | 12/2016 | Chan | B60C 23/002 |
| 2017/0217261 A1* | 8/2017 | Mays | B60C 23/0486 |
| 2020/0086697 A1* | 3/2020 | Fischer | B60C 23/0479 |

FOREIGN PATENT DOCUMENTS

| | | |
|---|---|---|
| DE | 19915999 C2 | 9/2001 |
| DE | 102004016288 B3 | 8/2005 |
| DE | 102005036594 A1 | 2/2007 |
| DE | 202011051292 U1 | 2/2012 |
| DE | 102010040539 A1 | 3/2012 |
| DE | 102010049090 A1 | 4/2012 |
| DE | 102014203260 A1 | 8/2015 |
| DE | 102016104585 A1 | 9/2016 |
| EP | 1044123 A1 | 10/2000 |
| EP | 3178672 A1 | 6/2017 |
| JP | 2004345465 A | 12/2004 |
| JP | 2005119533 A | 5/2005 |
| JP | 2013028338 A | 2/2013 |
| KR | 20140115635 A | 10/2014 |
| WO | 2009070063 A1 | 6/2009 |
| WO | 2012020166 A1 | 2/2012 |
| WO | 2016019707 A1 | 2/2016 |

\* cited by examiner

CONTROL DEVICE AND ELECTRONIC WHEEL UNIT FOR A WHEEL-MONITORING SYSTEM OF A VEHICLE, WHEEL-MONITORING SYSTEM FOR A VEHICLE AND METHOD FOR MONITORING WHEELS IN A VEHICLE

BACKGROUND OF THE INVENTION

Field of the Invention

The present invention relates to the field of the monitoring of wheels in vehicles, for example tire pressure-monitoring systems of motor vehicles such as e.g. passenger cars and trucks.

In particular, the invention relates to a control device for a wheel-monitoring system, to an electronic wheel unit for a wheel-monitoring system, to a wheel-monitoring system formed therewith, to a method for monitoring wheels and to a computer program product.

Control devices and electronic wheel units, wheel-monitoring systems implemented therewith and wheel-monitoring methods are known from DE 199 15 999 C2 and DE 10 2005 036 594 A1.

In such tire pressure-monitoring systems, often also referred to as TPMS, the vehicle wheels of a vehicle are each equipped with an electronic wheel unit by means of which at least one tire pressure is measured and corresponding tire pressure data are transmitted to a control device of the vehicle via a radio link.

In the event of an abnormality, for example an excessive loss of tire pressure, which is determined by the vehicle-side control device on the basis of the transmitted tire pressure data, the control device makes available an abnormality message, for example a warning to the driver.

A corresponding determining criterion is permanently predefined for the determination of the abnormality, wherein the criterion defines e.g. at least one threshold value with which an acquired tire pressure is compared, and in the event of the threshold value being undershot the abnormality, i.e. the loss of tire pressure, is determined.

It is disadvantageous here that the criterion which is used to determine the abnormality, and the details thereof, can only be changed in a very restricted or costly fashion, for example by reprogramming of the respective functionality of the control device by specialized workshop personnel.

It is to be borne in mind in this context that for the various regions (e.g. USA, EU, China etc.) there are often specific legal specifications relating to such a determination criterion which is used in a tire pressure-monitoring system, with the result that e.g. the situation can occur in which a tire pressure-monitoring system which is provided for a specific region (e.g. EU) no longer satisfies the legal requirements if the respective vehicle is transposed into another region (e.g. USA).

Furthermore, other cases can be imagined in which it would be desirable to change a determination criterion used in a wheel-monitoring system, e.g. a tire pressure-monitoring system, for example with adaptation to a current driving situation or to the driving conditions resulting therefrom.

SUMMARY OF THE INVENTION

It is therefore an object of the present invention to improve a control device for a tire-monitoring system, an electronic wheel unit for a tire-monitoring system, a tire-monitoring system formed therewith, a method for monitoring wheels and a corresponding computer program product with respect to the determination of an abnormality.

A first aspect of the invention relates to a control device for a wheel-monitoring system of a vehicle which is equipped with vehicle wheels, wherein at least one of the vehicle wheels is equipped with an electronic wheel unit, arranged thereon, for detecting at least one wheel operating parameter of the respective vehicle wheel and for transmitting wheel operating data to the control device, and wherein the control device is designed to make available an abnormality message in the event of an abnormality which is determined on the basis of the transmitted wheel operating data. The control device is also designed to take into account position data relating to a current position of the vehicle for the determination of the abnormality.

The basic concept of the invention is to permit, when required, an automatic change of that criterion which is used for the determination of the abnormality, as is explained in more detail below.

In one embodiment, the control device is also designed to take into account weather data relating to the weather at the current position of the vehicle for the determination of the abnormality.

In a further embodiment there is provision that the control device has a program-controlled computer unit and an assigned memory unit, wherein in particular a program code which is used to operate the computer unit can be stored in the memory unit. Moreover, in this memory unit or another memory unit which is assigned to the control device it is possible, in particular, also to store data on the basis of which the control device can adapt the determination criterion as a function of the current position of the vehicle or of the weather at this position.

The control device can be integrated e.g. as part of onboard electronics of the respective vehicle, in particular in a digital communication system (e.g. a CAN bus system) of the vehicle and have, in addition to the functionality of the monitoring of wheels, e.g. further functionalities, e.g. as a central electronic control device (ECU, Electronic Control Unit) of the vehicle.

In one embodiment there is provision that the control device has a radio receiver for receiving the wheel operating data which are transmitted as radio signals, or is connected to such a radio receiver.

In one embodiment there is provision that the at least one wheel operating parameter comprises a tire pressure of the respective vehicle wheel, with the result that the wheel-monitoring system can have, in particular, at least the functionality of a TPMS.

The term "wheel operating parameter" comprises generally any physical variable which can be measured at the respective vehicle wheel and can be changed in accordance with a driving operation.

In this respect, the at least one wheel operating parameter can alternatively or additionally comprise, preferably, e.g. a tire temperature and/or a wheel rotational speed. As an alternative to or in addition to the wheel rotational speed, e.g. a wheel rotational position is also possible as a wheel operating parameter.

The "wheel operating data" according to the present application contain information about the respective wheel operating parameter or parameters (e.g. tire pressure measured values) and/or about at least one variable derived therefrom, such as e.g. a tire pressure which is corrected to a predefined temperature. Such a corrected tire pressure can be derived from the values for the tire pressure and tire temperature which are measured directly.

In addition to the transmission of such wheel operating data to the control device, there can also be provision for wheel data to be transmitted to the control device, which is to be understood as meaning physical variables which can be measured at the respective vehicle wheel and other properties of the respective vehicle wheel which depend essentially only on the condition of the wheel itself (e.g. Tire dimensions such as a tire diameter etc.) and/or do not depend directly on the current operation of the vehicle wheel (e.g. a tire profile depth).

In one embodiment, the control device is designed to determine, on the basis of the position data, which of a plurality of predetermined regions the vehicle is located in, and to select a determination criterion which is used for determining the abnormality, on the basis of the acquired region from a multiplicity of predetermined determination criteria.

The control device can be designed to determine the abnormality by means of a comparison of the transmitted wheel operating data with a threshold value.

In addition, the control device can be designed to adapt the threshold value on the basis of the position data relating to the current position of the vehicle.

In a further embodiment, the control device is also designed to adapt the threshold value on the basis of the weather data relating to the weather at the current position of the vehicle.

The threshold value can characterize, in particular, a deviation of the at least one wheel operating parameter from a setpoint value.

For example, the threshold value can characterise a deviation of the tire pressure of the respective vehicle wheel from a setpoint value, and the control device can be designed to adapt the deviation of the tire pressure of the respective vehicle wheel from the setpoint value, at the exceeding of which the abnormality message is made available, on the basis of the position data relating to the current position of the vehicle.

A second aspect of the invention relates to an electronic wheel unit for a wheel-monitoring system of a vehicle which is equipped with vehicle wheels, wherein the electronic wheel unit is designed to detect, while being arranged on one of the vehicle wheels, at least one wheel operating parameter of the vehicle wheel and to transmit wheel operating data to a control device of the vehicle. The electronic wheel unit is also designed to transmit an abnormality message to the control device of the vehicle in the event of an abnormality which is determined on the basis of the at least one detected wheel operating parameter, and to take into account position data relating to a current position of the vehicle for the determination of the abnormality.

In one embodiment, the electronic wheel unit is also designed to take into account weather data relating to the weather at the current position of the vehicle for the determination of the abnormality.

In a further embodiment, the electronic wheel unit has at least one sensor device for detecting the at least one wheel operating parameter, a program-controlled computer unit and an assigned memory unit and a radio transmitter for transmitting the wheel operating data in the form of radio signals.

In one development, the electronic wheel unit also has a radio receiver (e.g. as a component of a transceiver device of the wheel unit) in order thereby to be able to modify, via a radio link, the data which are stored in the memory unit of the wheel unit (e.g. by means of a bidirectional data link between the vehicle-side control device and the electronic wheel unit).

The sensor device of the electronic wheel unit can have e.g. a pressure sensor for detecting a tire pressure. Moreover, the sensor device can have e.g. a temperature sensor for detecting a tire temperature and/or an acceleration sensor for detecting an acceleration at the location of the electronic wheel unit, preferably e.g. a wheel acceleration.

The program-controlled computer unit with the assigned memory unit, which can contain e.g. Program code for the operational control of the computer unit, can be used e.g. to generate data telegrams on the basis of the sensor signals supplied by the sensors of the electronic wheel unit, wherein e.g. a wheel rotational speed can also be acquired on the basis of the above-mentioned measurement of an acceleration.

The radio signals (e.g. digital data telegrams) which are emitted by the radio transmitter of the electronic wheel unit for the purpose of transmitting the wheel operating data, can advantageously also be used to transmit the abnormality message, to be transmitted when required, i.e. after the determination of an abnormality, to the vehicle-side control device, for example by integrating the abnormality message, as a component of the information contained in a radio signal, into the radio signal.

In one embodiment of the electronic wheel unit, the at least one wheel operating parameter, which is detected by the electronic wheel unit, comprises a tire pressure of the respective vehicle wheel.

Alternatively or additionally, other wheel operating parameters can be detected and corresponding wheel operating data can be transmitted. In this respect, reference is made to the explanations of the terms "wheel operating parameters" and "wheel operating data" already given above.

Furthermore, the electronic wheel unit can be designed to transmit wheel data such as e.g. tire information (e.g. tire dimensions, design of tire, tire speed index, tire load index etc.). Such wheel data (e.g. relating to a rim and/or a tire mounted thereon) can be stored e.g. in the above-mentioned memory unit of the electronic wheel unit by workshop personnel when or after wheels or tires are newly fitted or refitted.

In one embodiment, the electronic wheel unit is designed to determine, on the basis of the position data, which of a plurality of predetermined regions the vehicle is located in, and to select a determination criterion which is used for determining the abnormality, on the basis of the acquired region from a multiplicity of predetermined determination criteria.

The electronic wheel unit can be designed to determine the abnormality by means of a comparison of the at least one wheel operating parameter with a threshold value.

In addition, the electronic wheel unit can be designed to adapt the threshold value on the basis of the position data relating to the current position of the vehicle.

In a further embodiment, the electronic wheel unit is also designed to adapt the threshold value on the basis of the weather data relating to the weather at the current position of the vehicle.

The threshold value can characterize, in particular, a deviation of the at least one wheel operating parameter from a setpoint value.

For example, the threshold value can characterize a deviation of the tire pressure of the respective vehicle wheel from a setpoint value, and the electronic wheel unit can be designed to adapt the deviation of the tire pressure of the respective vehicle wheel from the setpoint value, at the exceeding of which the abnormality message is transmitted to the control device of the vehicle, on the basis of the position data relating to the current position of the vehicle.

A third aspect of the invention relates to a wheel-monitoring system of a vehicle which is equipped with vehicle wheels and which has a control device of the type described here and/or an electronic wheel unit of the type described here.

In one embodiment, the wheel-monitoring system also has a mobile radio device, for example a mobile radio communication interface, which is used to determine the position data and/or the weather data. In particular, modern motor vehicles often have in any case such an interface device, for example for implementing an Internet connection and/or a connection for outputting an automatic emergency call in the event of an accident. Such interfaces can advantageously be used within the scope of the present application.

The determination of the position data can be based e.g. on the determination of that radio cell in which the vehicle is currently located (tracking of radio cell location). In this context it is also possible to use refined methods for determining positions, which methods can be based e.g. on the valuation of radio signal transit times between the vehicle and a base position and/or transit time differences between the vehicle and various base stations.

By using the position data, determined e.g. in this way or in another way, relating to the current position of the vehicle it is then possible to retrieve, e.g. via the mobile radio device, weather information for generating the weather data to be taken into account or to retrieve these weather data themselves or a portion of the weather data from a corresponding data server (e.g. an Internet data server).

In one embodiment, the wheel monitoring system additionally has a satellite-based position-determining device, for example a GPS device, which is used to determine the position data, that is to say a device for implementing satellite-based determination of the position of the vehicle.

The current position of the vehicle can be determined particularly accurately by means of satellite-based position-determining process which is usually advantageously provided in any case e.g. in modern motor vehicles.

The acquired position data relating to the current position of the vehicle can be taken into account within the scope of the present application in a variety of ways for the determination of the abnormality.

In one embodiment, there is provision, for example, that on the basis of the position data it is determined in a first step which of a plurality of predetermined regions the vehicle is located in, and in a second step a determination criterion which is used to determine the abnormality is selected in accordance with the respective region.

The determination criteria which are provided for the various regions can define here, in particular, various threshold values for a wheel operating parameter, at the exceeding or undershooting of which an abnormality is determined. These threshold values can be based, preferably, e.g. on legal requirements for the respective regions.

Accordingly, in the invention it is possible e.g. for the wheel operating parameter "tire pressure" for a respective region-specific threshold value to be e.g. legally prescribed in various regions, the undershooting of which threshold value will bring about determination of the abnormality and consequently cause an abnormality message to be made available, here in the form of a message owing to excessively low tire pressure.

The threshold value, or each threshold value, can be defined e.g. as an absolute value. Alternatively, each threshold value can also be defined as a relative value, that is to say e.g. with respect to a determined rated value (setpoint value) of the respective wheel operating parameter.

In particular for the wheel operating parameter of the tire pressure there are, for various regions, legal requirements which provide for a tire pressure warning to be made available to the driver when a specific relative value is undershot, such as e.g. at a pressure loss of 20% or e.g. a pressure loss of 25%.

In addition to a region-specific use of at least one threshold value within the scope of a determination criterion, it is, of course, also possible to adapt or select other details of the determination criterion on a region-specific basis.

For the wheel operating parameter of the tire pressure it is possible to predefine for various regions, for example, a different definition of the tire pressure which is to be compared with a threshold value, such as on the one hand, e.g. an actually measured tire pressure and, on the other hand, e.g. a corrected, in particular temperature-compensated, tire pressure.

Furthermore, within the scope of the determination of the abnormality in the individual regions differences may arise with respect to the vehicle speed, for example in that a vehicle speed range is predefined in which checking for an abnormality is to take place at all, or in that e.g. a determination criterion is predefined as a function of the vehicle speed.

Furthermore, in different regions it is possible to provide e.g. different requirements relating to the avoidance of faulty abnormality messages, such as e.g. the requirement for different numbers of measurements of the respective wheel operating parameter (e.g. of the tire pressure), the measurement results of which have to satisfy a specific criterion (e.g. exceeding or undershooting of a threshold value) for the respective abnormality to be determined.

All such region-specific particularities or details of determination criteria can advantageously be taken into account for the determination of the abnormality.

In one embodiment there is provision that in the wheel-monitoring system (whether in the vehicle-side control device or in the electronic wheel units), a multiplicity of selectable determination criteria or configuration data for adapting the employed determination criterion are stored in each case with assignment to an associated region or with assignment to one of a plurality of predetermined weather situations, with the result that the wheel-monitoring system can autonomously select or adapt, on the basis of the position data or the weather data, the determination criterion which is to be respectably used.

This selection of the determination criterion can be carried out e.g. by that component of the wheel-monitoring system which also checks whether the determination criterion is satisfied, that is to say, preferably, e.g. the control device of the vehicle or else e.g. the electronic wheel unit. Both specified components typically have suitable computer functionalities and memory functionalities.

Alternatively, that component which applies the determination criterion, i.e. checks whether it is satisfied, can also be different from that component in which the determination criteria or the configurations data relating thereto are respectively stored with assignment to an associated region or weather situation. In this alternative, the necessary data merely have to be transmitted from the second-mentioned component to the first-mentioned component.

As an alternative to an autonomous selection of the determination criterion which is to be used it is possible that after the position data have been acquired and, if appropriate, the region which is therefore present has been determined, the wheel-monitoring system retrieves the determination criterion or configuration data which are necessary for the latter, from an external device. Preferably e.g. the mobile radio device which has already been mentioned, of the wheel-monitoring system or of the vehicle, can be used for such retrieval, for example for retrieving the required data from a data server, designed for this purpose, on the Internet.

With the invention it is possible, as already mentioned, that, in addition to taking into account the position data, the weather data relating to the weather at the current position of the vehicle are taken into account.

In one embodiment, for the acquisition of the weather data there is provision that previously acquired position data are transmitted to an external device in order to retrieve the weather data or at least a portion thereof from the external device. Such retrieval can occur, in particular, e.g. via the already mentioned mobile radio device.

As an alternative to or in addition to retrieval from an external device, weather data or portions thereof can also be acquired by means of a sensor system, suitable for this purpose, of the wheel-monitoring system or of the vehicle. Accordingly, in one embodiment there is provision that the wheel-monitoring system has a sensor device for determining the weather data.

The sensor device can have e.g. a rain sensor for measuring the intensity of rain and/or a temperature sensor for measuring an ambient temperature and/or a moisture sensor for measuring the humidity of the ambient air.

Taking into account the weather data for the determination of the abnormality can provide e.g. that with respect in the case of weather conditions which are unfavorable in terms of driving safety, the determination of the abnormality is brought about with a higher level of sensitivity than in the case of weather conditions which are favorable in this respect.

With the wheel-monitoring system according to the third aspect of the invention, particularities and embodiments of the control device, described here, according to the first aspect of the invention and/or of the electronic wheel unit according to the second aspect of the invention can be provided as corresponding particularities or embodiments of the wheel-monitoring system.

A further aspect of the invention relates to a method for monitoring wheels in a vehicle which is equipped with vehicle wheels, wherein the method comprises the following steps:
  detecting at least one wheel operating parameter of at least one of the vehicle wheels and transmitting wheel operating data to a control device of the vehicle by means of an electronic wheel unit which is arranged on the respective vehicle wheel,
  making available an abnormality message in the event of an abnormality which is determined on the basis of the at least one detected wheel operating parameter and/or the transmitted wheel operating data,
  wherein position data relating to a current position of the vehicle are taken into account for the determination of the abnormality.

All of the particularities and embodiments which are described for a control device according to the first aspect of the invention, an electronic wheel unit according to the second aspect of the invention or a wheel-monitoring system according to the third aspect of the invention can also be used in a corresponding way to configure and/or develop the specified method for monitoring wheels.

A further aspect of the invention relates to a computer program product having a program code which, when executed on a data processing device (e.g. a data processing device of the control device and/or a data processing device of the electronic wheel unit), carries out a method for monitoring wheels of the type specified here.

The invention is described in more detail below on the basis of exemplary embodiments with reference to the enclosed drawings, of the said figures:

DESCRIPTION OF THE INVENTION

Figure 1:
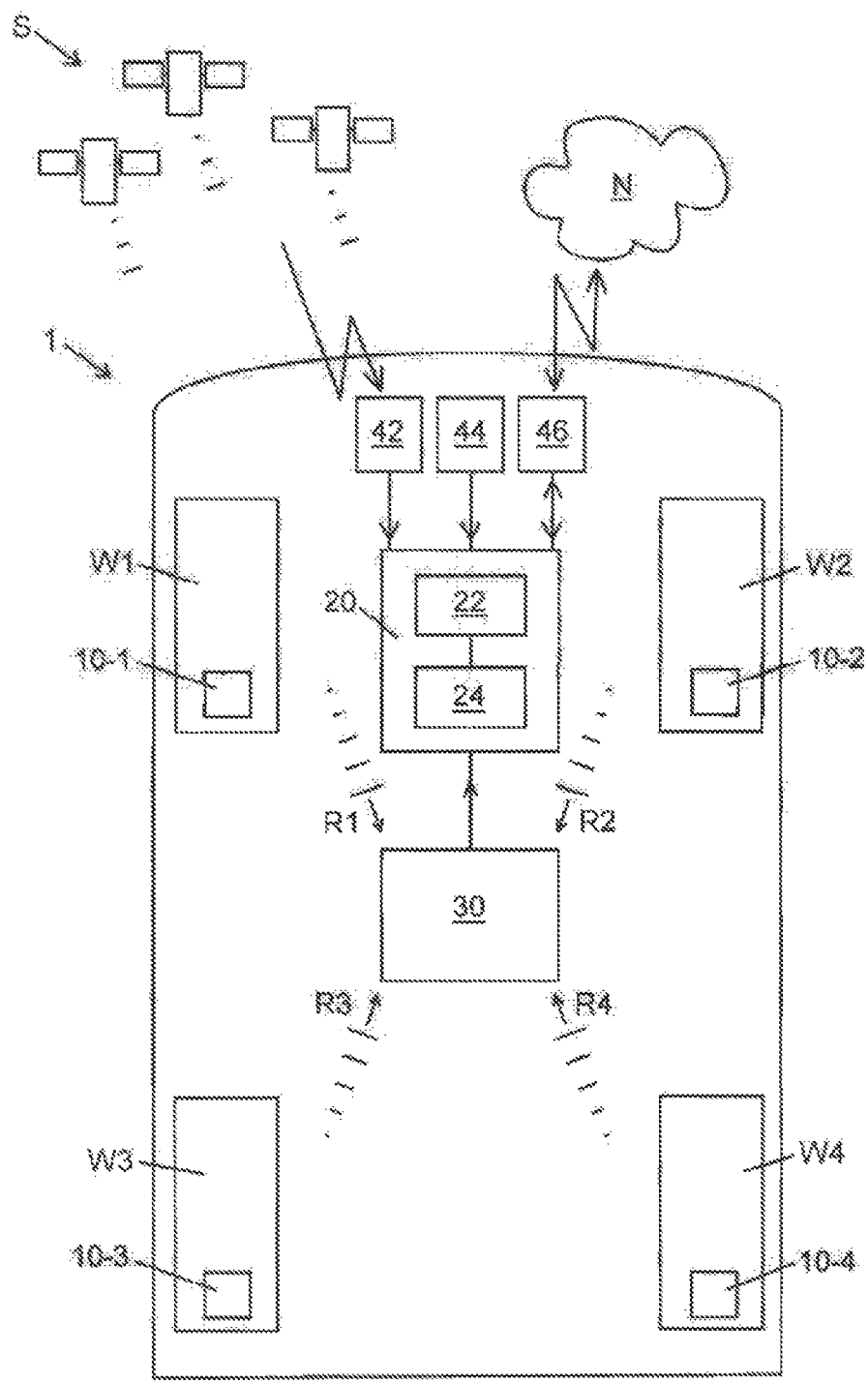
FIG. 1 shows a schematic plan view of a vehicle according to one exemplary embodiment, which is equipped with a wheel-monitoring system.

FIG. 1 shows a vehicle 1, here for example a four-wheel passenger car with vehicle wheels W1-W4.

Each of the vehicle wheels W1-W4 is equipped with an electronic wheel unit 10-1, 10-2, 10-3 or 10-4, arranged thereon, for detecting at least one wheel operating parameter of the respective vehicle wheel W1, W2, W3 or W4 and for transmitting corresponding wheel operating data to a control device 20 of the vehicle 1.

In the illustrated example, a tire pressure-monitoring system (TPMS) of the vehicle 1 is embodied using the electronic wheel units 10-1 to 10-4. Accordingly, the electronic wheel units 10-1 to 10-4 detect in each case at least one tire pressure of the respective vehicle wheel of the vehicle wheels W1 to W4, which in this example are each formed by a rim with an air-filled tire mounted thereon, and the electronic wheel units 10-1 to 10-4 transmit wheel operating data containing at least one item of information about the tire pressure to the control device 20 of the vehicle 1.

The electronic wheel units 10-1 to 10-4 are of an identical design and can be arranged e.g. on an inner side of a tire tread surface of the respective tire.

Figure 2:
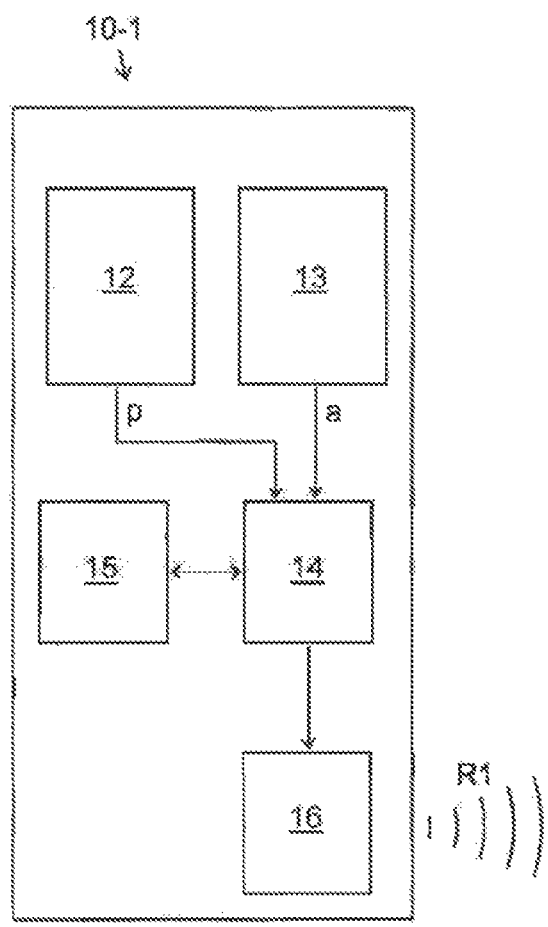
FIG. 2 shows a block circuit diagram of an electronic wheel unit used in the wheel-monitoring system in FIG. 1.

Referring to FIG. 2, which shows by way of example the design of the electronic wheel unit 10-1, each of the wheel units has a pressure sensor 12 for measuring the tire pressure and for making available a sensor signal "p" representing the tire pressure and an acceleration sensor 13 for measuring a radial acceleration at the location where the electronic wheel unit is mounted and for making available a sensor signal "a" representing this radial acceleration.

The sensor signals "p" and "a" are, as illustrated, fed for processing to a program-controlled computer unit 14, the operation of which is controlled by a program code stored in an assigned digital memory unit 15.

The computer unit 14 generates the wheel operating data which are to be transmitted and which are emitted from time to time in the form of radio signals R1, also referred to as data telegrams, to the vehicle-side control device 20 shown in FIG. 1. For this purpose, the electronic wheel unit 10-1 has a radio transmitter 16 for transmitting the wheel operating data in the form of the radio signals, and the control device 20 is for this purpose connected to a radio receiver 30 (shown in FIG. 1) for receiving the radio signals R1 to R4 of all the electronic wheel units 10-1 to 10-4.

The measurement of the radial acceleration and provision of the corresponding sensor signal "a" serves in the illustrated example to acquire, on the basis of an evaluation of the sensor signal profile, values of an instantaneous wheel rotational speed and/or of a wheel rotational position of the respective vehicle wheel and to incorporate corresponding information on this into the wheel operating data.

Returning to FIG. 1, the vehicle-side control device 20 has a program-controlled computer unit 22 for evaluating the wheel operating data contained in the radio signals R1 to R4, wherein the operation of the computer unit 22 is controlled by a program code stored in an assigned digital memory unit 24.

The electronic wheel units 10-1 to 10-4, in conjunction with the radio receiver 30 and the control device 20, form a wheel-monitoring system which is designed to make available a corresponding abnormality message in the event of an abnormality of the wheel operation being determined, wherein in the illustrated exemplary embodiment, in particular, a wheel pressure-monitoring system is designed to make available as required a tire pressure-warning message in the event of an abnormality of the tire pressure, e.g. when a predetermined tire pressure threshold value is undershot.

Of course, as an alternative to or in addition to the detection of the tire pressure and of the radial acceleration or the wheel rotational speed and/or the wheel rotational position it is also possible to detect other wheel operating parameters by means of corresponding sensors or by means of corresponding sensor signal evaluation of the electronic wheel units 10-1 to 10-4 and to transmit said wheel operating parameters in the form of corresponding wheel operating data to the vehicle-side control device 20.

In the illustrated exemplary embodiment, the abnormality of the tire pressure which undershoots a predefined pressure threshold value is determined by the vehicle-side control device 20 on the basis of the transmitted wheel operating data and used to make available a corresponding abnormality message in the form of a tire pressure warning message.

In addition to making available the abnormality message via a man-machine interface of the vehicle 1 to the driver of the vehicle 1, it is quite generally also alternatively or additionally possible to make said message available to further components (not illustrated) of the on-board electronics of the vehicle 1 or to further functionalities of the vehicle-side control device 20.

Moreover, the abnormality message can alternatively or additionally be transmitted to an external device, such as e.g. to a mobile terminal, operated in a communication network, of the driver or vehicle user, via a communication interface of the vehicle 1, for example a mobile radio device 46 of the vehicle 1.

A particularity of the tire pressure-monitoring system embodied in the vehicle 1 is that said system is designed to take into account position data relating to a current position of the vehicle 1 and/or weather data relating to the weather at the current position of the vehicle 1 for the determination of the abnormality, i.e. a loss of tire pressure in the embodiment shown.

In the illustrated example, for this purpose a satellite-based position-determining device in the form of a GPS device 42, a weather sensor device 44 and the mobile radio device 46 are integrated into the wheel-monitoring system.

The GPS device 42 is designed to determine the position data relating to the current position of the vehicle 1 by receiving and evaluating radio signals from a plurality of satellites S. The GPS device 42 can represent a component of a navigation system which is often provided in any case in modern vehicles, and said GPS device 42 transmits the acquired position data to the control device 20.

The weather sensor device 44 has, preferably, e.g. a rain sensor, such as can e.g. be present in any case in modern vehicles. Data which are representative of the intensity of the rain are supplied to the control device 20.

The mobile radio device 46 serves to permit the vehicle 1 to communicate with external devices. In the illustrated exemplary embodiment, a radio link to a mobile radio network N is therefore provided, which radio link in turn implements an Internet connection for the control device 20.

In the illustrated exemplary embodiment, the position data are acquired by means of the GPS device 42 and in addition weather data are acquired on the basis of the data supplied by the weather sensor device 44 and/or of data retrieved from an Internet server by means of the mobile radio device 46. In the latter case, the position data can be transmitted via the same Internet connection to the Internet server which sends back the weather data or portions thereof which are valid for the corresponding vehicle position.

Figure 3:
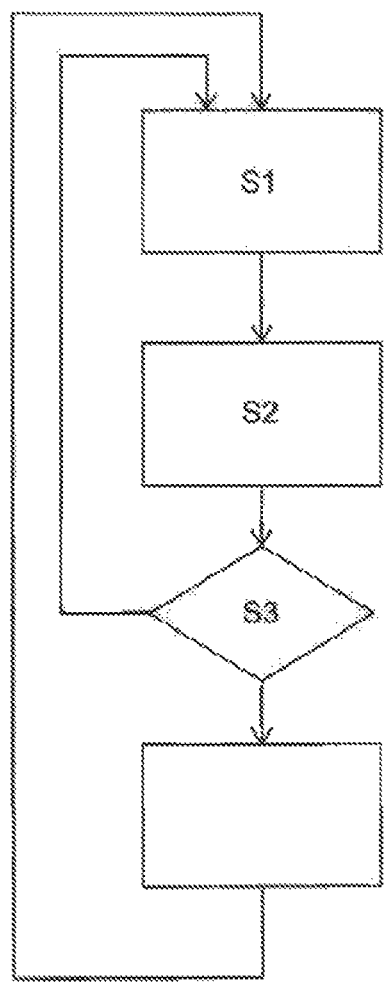
FIG. 3 shows a flowchart for a method for monitoring wheels.

FIG. 3 illustrates method steps according to an embodiment which are carried out within the scope of the wheel monitoring at the vehicle 1.

In a step S1, the electronic wheel units 10-1 to 10-4 each acquire wheel operating parameters, here e.g. respective tire pressure values and wheel rotational speeds and wheel operating data which are based thereon and which typically contain e.g. also an identification code identifying the respective electronic wheel unit, are emitted in the form of the radio signals R1 to R4.

In a step S2, the radio signals R1 to R4 are received by the radio receiver 30, and the wheel operating data contained therein are evaluated with assignment to the associated identification code of the respective electronic wheel unit 10-1 to 10-4 by the control device 20, wherein in the step the wheel operating data or portions thereof or data derived therefrom can also be passed on to other parts of the on-board electronics of the vehicle 1.

In a step S3, the control device 20 checks, in a program-controlled fashion by means of the computer unit 22 on the basis of the transmitted wheel operating data, whether an abnormality, that is to say in the specified exemplary embodiment e.g. an excessive loss of pressure in at least one of the tires, is present or not.

For this determination of an abnormality, a determination criterion which is defined by the program code stored in the memory unit 24 and/or a determination criterion which is defined by data stored separately from the program code in this memory unit 24 are/is used, which determination criterion can define in the illustrated exemplary embodiment e.g., preferably, a relative threshold value and/or an absolute threshold value, wherein in the case of undershooting the respective threshold value or values the determination of the abnormality is carried out by means of the tire pressure.

If no abnormality has been detected in step S3, the processing continues to step S1.

If, on the other hand, an abnormality has been detected in step S3, the processing continues to a step S4.

In step S4, the control device 20 makes available an abnormality message corresponding to the abnormality and outputs it in a predefined fashion. The outputting can be carried out e.g. to the driver of the vehicle 1. Alternatively or additionally, the abnormality message which is made available can be output e.g. to other parts of the on-board electronics. The processing then continues to step S1.

A particularity of step S3 is that, for the determination of the abnormality, position data relating to the current position of the vehicle 1 and/or weather data relating to the weather at the current position of the vehicle 1 are taken into account, that is to say, for example by correspondingly adapting the determination criterion to be used.

On the basis of the position data it is possible in this context, in particular, to implement region-specific adaptation of a specific determination criterion, for example adaptation of the threshold value or values, the undershooting of which by the tire pressure is to bring about detection of an abnormality for the respective vehicle wheel of the vehicle wheels W1 to W4.

Moreover, e.g. adaptation of a number, required by the determination criterion, of successively received radio signals which are based on the presence of an abnormality, can be implemented region-specifically, which adaptation is a precondition for the ultimate detection of the abnormality.

Alternatively or additionally, e.g. adaptation of the determination criterion, for example relating to a navigation system of the vehicle 1, can also be implemented as a function of a type of driving underlying surface (e.g. field path, country road, freeway etc.), detected by means of the navigation system.

With respect to the possibly provided taking into account of weather data, it is interesting, in particular in the case of a tire pressure-monitoring system, to take into account the intensity of the rain and/or an ambient temperature at the current position of the vehicle 1.

In summary, with the invention and the described exemplary embodiments, monitoring of wheels in a vehicle is improved with respect to the making available of abnormality messages, in that automatic adaptation of settings or of a determination criterion as a function of the explained ambient conditions, i.e. the position of the vehicle and/or the weather at the position of the vehicle, is provided.

In contrast to the exemplary embodiment described above, in which the determination of the abnormality and the making available of the abnormality message is implemented by the vehicle-side control device 20, according to a further embodiment there can also be provision that these tasks are performed by the electronic wheel units 10-1 to 10-4. A possibility for this is that the position data or weather data which are to be taken into account are transmitted to the electronic wheel units 10-1 to 10-4, and the software running in the respective computer units of the electronic wheel units is embodied correspondingly. The transmission of these relevant data can be brought about e.g. by virtue of the fact that the radio link between the vehicle-side control device 20 and the electronic wheel units 10-1 to 10-4 is embodied bidirectionally, that is to say a radio transceiver device is made available both on the vehicle side and on the wheel side.

LIST OF REFERENCE DESIGNATIONS

1 Vehicle
W1 to W4 Vehicle wheels
10-1 to 10-4 Electronic wheel units
R1 to R4 Radio signals
12 Pressure sensor
p Sensor signal
13 Acceleration sensor
a Sensor signal
14 Computer unit
15 Memory unit
16 Radio transmitter
20 Control device
22 Computer unit
24 Memory unit
30 Radio receiver
S Satellites
42 GPS device
44 Weather sensor device
N Mobile radio network
46 Mobile radio device
S1 Step
S2 Step
S3 Step
S4 Step

The invention claimed is:

1. A control system for a wheel-monitoring system of a vehicle having vehicle wheels with an electronic wheel unit disposed in or on at least one of the vehicle wheels for detecting at least one wheel operating parameter of a respective vehicle wheel and for transmitting wheel operating data to the control system, the control system comprising:
a control device configured to:
adapt a threshold value on the basis of position data relating to a current position of the vehicle;
compare the at least one wheel operating parameter to a setpoint value to determine a deviation of the at least one wheel operating parameter from the setpoint value;
determine whether the deviation indicates an abnormality has occurred, based on a comparison of the deviation with the adapted threshold value; and
provide an abnormality message to at least one of a driver of the vehicle or on-board electronics of the vehicle in an event of an abnormality being determined.

2. The control system according to claim 1, wherein said control device is further configured to take into account weather data relating to weather at the current position of the vehicle for the determination of the abnormality.

3. The control system according to claim 1, wherein said control device has a program-controlled computer and an assigned memory.

4. The control system according to claim 1, further comprising a radio receiver for receiving the wheel operating data which are transmitted as radio signals, said radio receiver being connected to or integrated in said control device.

5. The control system according to claim 1, wherein the at least one wheel operating parameter contains a tire pressure of the respective vehicle wheel.

6. The control system according to claim 1, wherein said control device is configured to determine, on a basis of the position data, which of a plurality of predetermined regions the vehicle is located in, and to select a determination criterion which is used for determining the abnormality, on a basis of an acquired region from a multiplicity of predetermined determination criteria.

7. The control system according to claim 1, wherein said control device is configured to adapt the threshold value on a basis of weather data relating to weather at the current position of the vehicle.

8. An electronic wheel unit system for a wheel-monitoring system of a vehicle having vehicle wheels, the electronic wheel unit system comprising:
- an electronic wheel unit configured to detect, while being disposed on one of the vehicle wheels, at least one wheel operating parameter of a vehicle wheel and to transmit wheel operating data to a control device of the vehicle; and
- said electronic wheel unit configured to transmit an abnormality message to the control device of the vehicle in an event of an abnormality determined by a control device of the electronic wheel unit, said control device of said electronic wheel unit configured to:
  - adapt a threshold value on the basis of position data relating to a current position of the vehicle;
  - compare the at least one wheel operating parameter to a setpoint value to determine a deviation of the at least one wheel operating parameter from the setpoint value;
  - determine whether the deviation indicates an abnormality has occurred, based on a comparison of the deviation with the adapted threshold value; and
  - provide the abnormality message to the control device of the vehicle in an event of an abnormality being determined.

9. The electronic wheel unit system according to claim 8, wherein said electronic wheel unit is further configured to take into account weather data relating to weather at the current position of the vehicle for the determination of the abnormality.

10. The electronic wheel unit system according to claim 8, wherein said electronic wheel unit having:
- at least one sensor for detecting the at least one wheel operating parameter;
- a program-controlled computer connected to said sensor;
- an assigned memory connected to said program-controlled computer; and
- a radio transmitter for transmitting the wheel operating data in a form of radio signals, said radio transmitter connected to said program-controlled computer.

11. The electronic wheel unit system according to claim 8, wherein the at least one wheel operating parameter includes a tire pressure of the vehicle wheel.

12. The electronic wheel unit system according to claim 8, wherein said electronic wheel unit is configured to determine, on a basis of the position data, which of a plurality of predetermined regions the vehicle is located in, and to select a determination criterion which is used for determining the abnormality, on a basis of an acquired region from a multiplicity of predetermined determination criteria.

13. The electronic wheel unit system according to claim 8, wherein said electronic wheel unit is further configured to adapt the threshold value on a basis of weather data relating to weather at the current position of the vehicle.

14. A wheel-monitoring system of a vehicle having vehicle wheels, the wheel-monitoring system comprising:
- a control device;
- an electronic wheel unit disposed on one of the vehicle wheels and configured to detect at least one wheel operating parameter of a vehicle wheel and to transmit wheel operating data to said control device;
- said control device configured to:
  - adapt a threshold value on the basis of position data relating to a current position of the vehicle;
  - compare the at least one wheel operating parameter to a setpoint value to determine a deviation of the at least one wheel operating parameter from the setpoint value;
  - determine whether the deviation indicates an abnormality has occurred, based on a comparison of the deviation with the adapted threshold value; and
  - provide an abnormality message to at least one of a driver of the vehicle or on-board electronics of the vehicle in an event of an abnormality being determined.

15. The wheel-monitoring system according to claim 14, further comprising a mobile radio connected to said control device.

16. The wheel-monitoring system according to claim 14, further comprising satellite-based position-determining circuitry connected to said control device.

17. The wheel-monitoring system according to claim 14, further comprising a sensor for determining weather data.

18. A method for monitoring wheels in a vehicle being equipped with vehicle wheels, which comprises the following steps of:
- detecting at least one wheel operating parameter of at least one of the vehicle wheels;
- transmitting wheel operating data to a control device of the vehicle by means of an electronic wheel unit disposed on a respective vehicle wheel;
- adapting a threshold value on the basis of position data relating to a current position of the vehicle;
- comparing the at least one wheel operating parameter to a setpoint value to determine a deviation of the at least one wheel operating parameter from the setpoint value;
- determining whether the deviation indicates an abnormality has occurred, based on a comparison of the deviation with the adapted threshold value; and
- providing an abnormality message to at least one of a driver of the vehicle or on-board electronics of the vehicle in an event of an abnormality being determined.

19. A non-transitory computer readable medium having computer executable instructions for performing a method for monitoring wheels in a vehicle being equipped with vehicle wheels, which comprises the following steps of:
- detecting at least one wheel operating parameter of at least one of the vehicle wheels;
- transmitting wheel operating data to a control device of the vehicle by means of an electronic wheel unit disposed on a respective vehicle wheel;
- adapting a threshold value on the basis of position data relating to a current position of the vehicle;
- comparing the at least one wheel operating parameter to a setpoint value to determine a deviation of the at least one wheel operating parameter from the setpoint value;
- determining whether the deviation indicates an abnormality has occurred, based on a comparison of the deviation with the adapted threshold value; and
- providing an abnormality message to at least one of a driver of the vehicle or on-board electronics of the vehicle in an event of an abnormality being determined.

* * * * *